United States Patent [19]

Gershbein

[11] 4,029,048
[45] June 14, 1977

[54] INDOOR-OUTDOOR TOILET FOR SMALL ANIMALS

[76] Inventor: George Gershbein, 30 W. 69th St., New York, N.Y. 10023

[22] Filed: Aug. 25, 1975

[21] Appl. No.: 607,220

[52] U.S. Cl. .................................. 119/1; 119/19
[51] Int. Cl.² .................................... A01K 1/035
[58] Field of Search ................ 119/1, 19, 17, 15; 160/372, 374, DIG. 8, DIG. 12, 20, 31, 215, 375, 179

[56] References Cited
UNITED STATES PATENTS

| | | | |
|---|---|---|---|
| 2,470,223 | 5/1949 | Powels | 119/19 |
| 2,524,230 | 10/1950 | Martin | 160/375 |
| 2,832,406 | 4/1958 | Turenne | 160/179 |
| 2,932,279 | 4/1960 | Giles | 119/19 |
| 3,487,814 | 1/1970 | Ingebritsen | 119/19 |
| 3,735,735 | 5/1973 | Noroian | 119/1 |

Primary Examiner—J.N. Eskovitz
Assistant Examiner—Peter K. Skiff

[57] ABSTRACT

A combination litter box and carrying case for small animal pets is described which is in the form of a generally enclosed housing having a front wall provided with an opening dimensioned to permit passage of the animal therethrough. The housing extends rearwardly of the front wall. The portion of the housing near the front wall is positioned within a window opening and connected to the window frame of the dwelling to cause the housing to extend outwardly and to dispose the major portion thereof outside of the dwelling. The opening in the front wall permits the animal to freely move between the housing, which serves as an externally mounted litter box, and the dwelling. The walls of the housing other than the front wall are advantageously provided with at least two ventilating openings which permit air flow through the housing and permit odors therein to escape therefrom to the outside of the dwelling. The housing is provided with handle means to permit the housing to be used as a carrying case for the animal when it is removed from the window frame.

18 Claims, 3 Drawing Figures

U.S. Patent   June 14, 1977   4,029,048
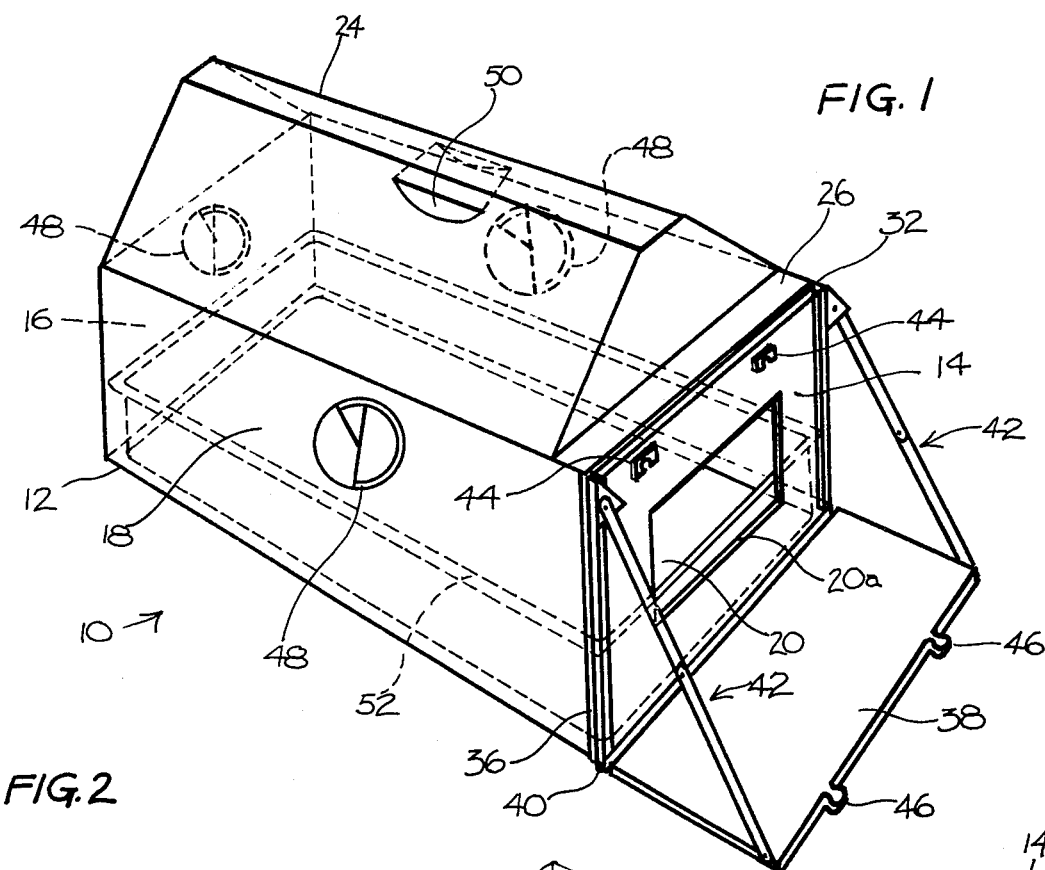
FIG. 1
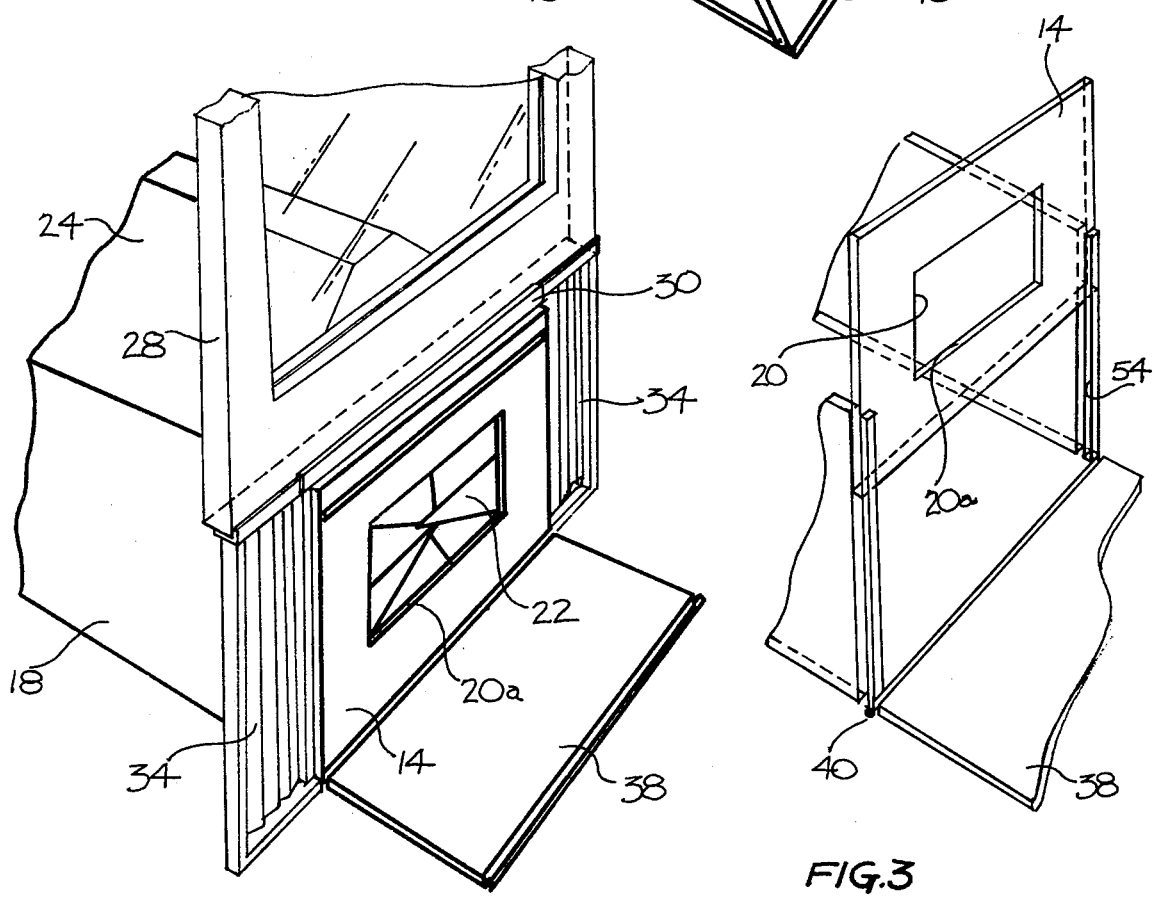
FIG. 2
FIG. 3

4,029,048

INDOOR-OUTDOOR TOILET FOR SMALL ANIMALS

BACKGROUND OF THE INVENTION

As best known by owners of small animal pets, and particularly cats, the waste materials of those animals and especially the urine produce foul odors when permitted to stand for any appreciable amount of time. The approach which has generally been taken is to attempt to train or encourage the pet to excrete in one, most unobjectionable place within a dwelling or household. This has been successful to some extent by providing boxes or shallow containers filled with commercially available litter materials which tend to absorb the urine and to that extent assist in controlling the odors. Clearly, this approach is not fully effective and the problem may still be acute in small confined apartments where the litter box must of necessity be located in areas shared most frequently with pet's owners.

It may be possible, in some instances, to train the pet to leave the premises or dwelling prior to excretion. For this and other purposes there is known in the prior art various devices which permit an animal to freely come into and go out from a house. For example, an animal hatch is disclosed in U.S. Pat. No. 3,091,221; a windowgate assembly in U.S. Pat. No. 3,499,246; and a pet door apparatus in U.S. Pat. No. 3,690,299. However, it should be clear that these and other like devices are only useful when they can be located at or near ground level. Thus, they cannot be used in high rise apartments where the windows are substantially above ground level unless a balcony or the like exists. An additional problem which exists with these devices under discussion is that they do not confine the animal once they leave the house and this may expose the pet to danger and injury as well may permit the animal to escape or otherwise be lost. Additionally, an examination of the above patents reveals that the devices therein disclosed are typically mounted in or connected to the house or premises. This feature somewhat limits the flexibility of the devices since they cannot readily be moved from one location to another, as when the owners of the pet go on vacation.

There are also known in the prior art shelters for small animals, such as those disclosed in U.S. Pat. Nos. 2,932,279 and 3,738,322. Such shelters are typically in the nature of rectangular housings which are constructed for being mounted within a wall opening, such as a window of a basement, with substantially the full length of the housing being projected interiorly of the building structure from the opening or window. Shelters of this type are intended to be used by persons who enjoy having small animals but do not desire to admit the animal to the interior of the house. Accordingly, such shelters prevent the animals to be fully exposed to the elements and generally permits the animal to have the comfort and warmth that results from the animal being indoors. While openings are provided for permitting free movements of the animal between the housing and the outside of the house, the movements between the housing and the interior of the house are generally limited. In the animal shelter of U.S. Pat. No. 3,738,322, the housing is made out of an impervious wall which prevents the transmission of odors from the animal shelter to the interior of the building.

SUMMARY OF THE INVENTION

Accordingly, it is an object of the present invention to provide a litter box which is mountable externally of a dwelling but which permits free access thereinto from the interior of the dwelling.

It is an other object to provide a litter box as in the last object which is simple in construction and economical to manufacture.

It is still another object of the invention to provide a litter box which may be mounted externally of a dwelling to cause odors within the litter box to escape without permeating the dwelling.

It is yet another object to provide a litter box as in the last object which confines the animal while being outside of the dwelling to prevent injury or loss to the animal.

It is a further object of the invention to provide a combination litter box of the type above suggested and a carrying case to facilitate transportation of the litter box and the animal pet from one location to another.

It is still a further object of the invention to provide a litter box-carrying case combination device as in the last object which may be easily and rapidly installed at a new location.

It is yet a further object of the invention to provide a litter box which is mountable exteriorly of a dwelling opening and which prevents odors caused by pets independently of the location of the dwelling in which the litter box is placed.

It is an additional object of the invention to provide a litter box which is mountable exteriorly of a dwelling opening and which prevents odors caused by pets independently of the size of the dwelling in which the litter box is placed.

It is still an additional object of the invention to provide a litter box which permits a pet animal to leave its waste materials outside of a dwelling and therefore confines the odors associated therewith to the outside of the dwelling while providing the pet full access to the interior of the dwelling.

It is yet an additional object to provide a litter box which may be mounted inside or outside of a dwelling and which includes ventilating means for removing odors from the litter box.

The above objects, as well as others which will become apparent from the description that follows, are achievable with the present invention which comprises a generally enclosed housing having a front wall provided with an opening dimensioned to permit passage of an animal therethrough. Said housing extends rearwardly of said front wall. Mounting means is provided for connecting the portion of said housing proximate to said front wall to a window frame of a dwelling to cause said housing to extend outwardly and to dispose the major portion thereof outside the dwelling. Said opening permits the animal to move between said housing and the dwelling. Said housing further includes ventilating means for permitting air flow whrough said housing and for permitting odors therein to escape therefrom to the outside of the dwelling.

While the litter box is mountable within a window opening, it is equally mountable within any opening of a dwelling. Also, while the litter box of the invention may be permanently installed within a dwelling opening, mounting means may be provided which permits easy and rapid removal and installation of the litter box at different locations. In the last mentioned case, said housing is advantageously provided with means such a handle to permit the litter box to be used as a carrying case.

BRIEF DESCRIPTION OF THE DRAWINGS

With the above and additional objects and advantages in view, as will hereinafter appear, this invention comprises the devices, combinations and arrangement of parts hereinafter described and illustrated in the accompanying drawings of a preferred embodiment in which:

FIG. 1 is a perspective view of a combination litter box and carrying case in accordance with the present invention, showing the access opening exposed by the pivotally mounted closure wall or ledge;

FIG. 2 is a fragmented perspective view similar to FIG. 1, showing one example of mounting means for mounting the litter box within a window frame opening; and FIG. 3 is a fragmented perspective view of the litter box shown in FIG. 2, showing the manner in which the front wall of the litter box may be removable to provide access to the interior thereof for the purpose of cleaning the same.

DESCRIPTION OF THE PREFERRED EMBODIMENT

Referring now specifically to the drawings, in which identical or similar parts are designated by the same reference numerals throughout, and first referring to FIG. 1, the litter or indoor-outdoor do-box for small animals is generally designated by the reference numeral 10.

The litter box 10 is generally in the form of a substantially closed housing 12. While shown to be rectangular, it will become evident from the description that follows that the shape of the housing is not critical and any shaped housing may be used. In the presently preferred embodiment, the housing 12 has a front wall 14 and rear wall 16 spaced therefrom. A pair of spaced side walls 18 are provided as shown.

The front wall 14 is provided with an opening 20 dimensioned to permit passage of a small animal, such as a cat, therethrough. As used in the specification and in the claims, the reference to directions, such as front or rear, is only to facilitate a description of the invention and is not intended to limit the scope of the invention.

As will be more fully described hereafter, the major portion of the housing 12 is normally disposed outside of a dwelling. The opening 20 is intended to permit the animal to freely move between the inside of the dwelling and the inside of the housing 12. To prevent objectionable odors from permeating the dwelling, flexible closure means 22 is advantageously provided for normally closing the opening 20. Any deflectable or flexible closure means may be used for this purpose. By way of example only, the closure means shown is in the nature of rubber-like sections or sheets each of which is connected to a portion of the front wall 14 about the periphery of the opening 20 and which projects inwardly towards the center of the opening. The sections or sheets overlap each other to form a wall which closes the opening 20 when the sections are undeflected. Because the sections are made very flexible, an animal has no difficulty to deflect the closure means 22 to the open condition. In this way, the closure means 22 is effective to prevent odors from passing through the opening 20 while it permits free passage of the pet therethrough. Other possible constructions which may be used for the closure means 22 are hatches, gate and door assemblies of the type disclosed in the above U.S. Pat. Nos. 3,091,221; 3,499,246 and 3,690,299 respectively.

In the presently preferred embodiment, the housing 12 is shown to be provided with a pitched roof 24 which extends along the entire longitudinal length of the housing 12 with the exception of a flat roof portion 26 proximate to the front wall 14.

Referring to FIG. 2, the manner of mounting the housing 12 within a window opening of a dwelling is shown. With the housing resting on the lower ledge of the opening, the window frame 28 is lowered to bring the same into abutment against the flat roof portion 26. To improve the holding action of the housing within the opening by the frame 28, an upwardly turned U-shaped channel 30 may be used which receives the lower edge of the frame 28 and which has a downwardly depending lip (not shown) which extends along the length of the channel 30 and which is receivable a groove 32 which extends along the width of the housing 12 as shown in FIG. 1. By locking the position of the channel 30 and preventing transverse movements thereof with respect to the frame 28, the position of the housing 12 similarly becomes locked in place as long as the frame 28 is in the lower engaging or locking position as shown in FIG. 2. When the frame is lifted, the channel 30 may be disengaged from the groove 32 and the housing released for movement from the window opening.

Where the width of the housing 12 is materially less than the width of the window opening, adjustable wall or partition means is advantageously provided for closing any openings which would otherwise result from the difference in widths. In the embodiment shown, this wall means is in the form of an accordion-type extension panel or sleeve not unlike the type commonly used in conjunction with window fans or window air conditioning units. Such panels may serve numerous purposes. Firstly, by cooperating with a groove 36 or the like on the housing 12, the extension panels assist in retaining the housing 12 within the window opening as did the channel 30 and the frame 28 in conjunction with the upper groove 32. Secondly, by closing off any resulting openings on the sides of the housing 12, the pet may not escape therethrough but is confined to the dwelling and the housing. Clearly, such an arrangement, permits the use of a wide range of sizes of housings within a wide range of openings. In the embodiment being described, then, the channel 30 and the panels 34 form part of the mounting means which connects the portion of the housing 12 proximate to the front wall 14 to the window frame 28 of the dwelling to cause the housing 12 to extend outwardly and to dispose the major portion of the housing 12 outside of the dwelling. With such a construction, the small animal can freely move between the housing 12 and the interior of the dwelling.

In the presently preferred embodiment, the litter box 10 is provided with closure means 38 for closing the opening 20 when the box 10 is transported with a small animal therein to prevent escape of the animal from the housing. For example, the closure means 38 may be pivotally mounted at one edge thereof to the lower front edge of the housing 12 for movement between a closed position for blocking the opening 20 and an open, substantially horizontal position disposed below the opening 20 as shown in Figures to serve as a ledge or jumping platform for permitting an animmal to jump thereon prior to entry into the housing 12 through the opening 20. A piano-type hinge 40, for example, may be used to mount the closure means or platform 38 on the housing.

As described above, the platform is pivotally mounted about a horizontal axis below the opening 20. In order to maintain the platform in a horizontal plane in the open condition thereof, there is provided pivot limiting means which prevents the platform from dropping below the desired horizontal plane. The pivot limiting means may be of any conventional type, although foldable levers or extention arms 42 as shown may be used for this purpose. Locking means is advantageously provided to lock the platform 38 in the closed vertical position, such as when transporting the animal to maintain the opening 20 closed. Any conventional locking means may be used. Shown in FIG. 1, by way of illustration only, are female locking receptacles 44 adapted to receive the male locking members 46 in snap fitting engagement.

In accordance with an important feature of the present invention, the housing is provided with ventilating means for permitting air flow through the housing and for permitting odors therein to escape therefrom to the outside of the dwelling. One type of ventilating means includes at least one opening 48 in the walls of the housing 12. In the embodiment shown, three ventilating openings 48 are provided, namely one in the rear wall 16 and one in each of the side walls 18, to permit cross-ventilation through the housing. Clearly, any other conventional means for ventilating the housing 12 is also contemplated by this invention. Thus, an exhaust fan may be used in one of the openings 48 to increase the circulation of air through the housing. The number and locations of the openings 48 is not critical and, as should be evident, the number of openings, as well as the positions thereof may be changed with different degrees of advantages to best suit a given size housing.

The versatility of the litter box 10 is substantially increased by making the same easily transportable. By providing, for example, recesses 50 within the pitched roof 24, a handle or gripping portion is formed which permits the litter box 10 to also be used as a carrying case for the animals. Any other type of handle may be used. When also useable as a carrying case, the litter box 10 can be used as a litter box, a carrying case, or a litter box which can be easily transported with the pet therein and installed at different locations. This is particularly useful when the pet owners are away from their dwellings for any periods of time and take their pets with them.

Being a litter box, the box 10 is advantageously provided with a tray 52 whose dimensions are selected to substantially cover the bottom wall of the housing. The height of the tray 52 is selected to provide sufficient depth in order to receive an adequate quantity of litter material. On the other hand the height of the tray 52 should be small enough so as not block the opening 20 and thereby interfere with the movements of the animals therethrough. As shown in FIG. 1, good results are obtained when the tray walls reach but do not rise above the lower edge 20a of the opening 20. The tray 52 and the litter material may be of the type conventionally used. However, as it will be appreciated, the litter box 10 now maintains the odor-producing substances outside of the dwelling. Additionally, because the housing 12 is ventilated, the odors are efficiently dissipated to the atmosphere outside of the dwelling. To the extent that some odors still exist in the housing, the flexible closure means 22 keeps such odors out of the dwelling or premises while giving the pet full access to the interior thereof.

To provide full access to the interior of the housing 12, one of the housing walls may be movable or removable. This permits removal of the tray 52 for cleaning. While any construction which permits removal of the tray may be used, a possible construction is shown by way of example in FIG. 3. Here, the front edge portions of the side walls 18 are provided with inwardly facing slots or grooves 54 which are vertical and parallel and serve as guides for the lateral edges of the front wall 14. Such a construction results in the front wall 14 in being slidably mounted for vertical movements relative to the housing. Lifting of the front wall 14, and, indeed, removal of the front wall from the housing provides ample clearance for the removal and cleaning of the tray.

While it will appreciated that the litter box 10 prevents odors from permeating the interior of a dwelling and provides free access of the interior of the dwelling by the pet, the box 10 also confines the animal outside of the dwelling to prevent injury and loss thereof. Additionally, the box 10 is fully transportable and, among its other advantages, can be used with any type of premises, whether large or small, whether an apartment or a house. This is the case because the box 10 can be installed within any opening of a dwelling and, once so installed, the premises proximate to the opening does not experience undesirable odors to any noticeable degree.

Numerous alterations of the structure herein disclosed will suggest themselves to those skilled in the art. However, it is to be understood that the present disclosure relates to a preferred embodiment of the invention which is for purposed of illustration only and is not to be construed as a limitation of the invention.

What is claimed is:

1. A litter box for animals comprising a generally enclosed housing having a front wall provided with an opening dimensioned to normally permit substantially free passage of an animal therethrough, said housing extending rearwardly of said front wall; waste receiving means disposed within said housing; and mounting means for mounting said housing through a wall of a dwelling to cause said housing to extend outwardly and to dispose the major portion thereof outside the dwelling, while said opening in said housing permits the animal to move between said housing and the dwelling, said housing further including means for ventilating to the outside for permitting air flow through said housing and for permitting odors therein to escape therefrom to the outside of the dwelling.

2. A litter box as defined in claim 1, wherein there is further provided closure means for closing said opening while transporting said housing with an animal therein to prevent escape of the animal from the housing.

3. A litter box as defined in claim 2, wherein said closure means is connected to said housing and is mounted for movement between a closed position for blocking said opening, and an open substantial horizontal position below said opening to serve as a ledge for permitting an animal to jump thereon prior to entry into said housing through said opening.

4. A litter box as defined in claim 3, wherein said closure means comprises a flat wall pivotally mounted about a horizontal axis below said opening, and including limiting means for limiting the movement of said flat wall beyond the open horizontal position thereof.

5. A litter box as defined in claim 4, wherein said limiting means comprises foldable levers pivotally connected to said housing and to said flat wall, said levers being folded when said closure means is in its closed position and being unfolded in the open position of said closure means.

6. A litter box as defined in claim 3, further including locking means for maintaining said closure means in said closed position when the box is used as a carrying case or when the animal is to confined to said housing.

7. A litter box as defined in claim 1, wherein said mounting means connects a portion of said housing proximate to said front wall to a window frame of the dwelling.

8. A litter box as defined in claim 7, wherein said mounting means comprises an extendable panel connectable to said housing and having a height substantially corresponding to the height of said housing, said panel having a width adjustable to correspond to the width of the window frame, whereby expansion of said panel and lowering the window to abut against said portion of said housing fixes the position of the box within the window frame and prevents excessive movements of the box therein.

9. A litter box as defined in claim 1, further comprising handle means on said housing for facilitating carrying of said housing when the same is used as a carrying case.

10. A litter box as defined in claim 9, wherein at least an upper portion of said housing is formed in the shape of a pitched roof, said handle means being formed as a recess in said pitched roof.

11. A litter box as defined in claim 1, wherein said waste receiving means comprises a tray and wherein said front wall is movable with respect to said housing to provide access to the interior thereof, whereby movement of said roof wall and exposure of said housing interior permits cleaning a said tray.

12. A litter box as defined in claim 11, wherein said front wall is upwardly slidably movable relative to said housing for permitting removal of said tray through the front side of said housing.

13. A litter box as defined in claim 1, wherein said ventilating means comprises at least one opening in the walls of said housing.

14. A litter box as defined in claim 13, wherein a plurality of openings are provided in said housing walls to permit cross-ventilation through said housing.

15. A litter box as defined in claim 1, wherein said ventilating means includes an exhaust fan in said housing.

16. A litter box as defined in claim 1, further comprising at least one resilient and flexible member extending across said opening to normally close the same to prevent odors within said housing to penetrate into the dwelling, said resilient member being deflectable by an animal entering or leaving said housing through said opening.

17. A litter box as defined in claim 16, wherein a plurality of overlapping flexible members are provided to normally close said opening.

18. A litter box for animals comprising a generally enclosed housing having a front wall provided with an opening dimensioned to normally permit substantially free passage of an animal therethrough, said housing extending rearwardly of said front wall; waste receiving means disposed within said housing; and mounting means for connecting the portion of said housing proximate to said front wall through a wall in a dwelling to cause said housing to extend outwardly and to dispose the major portion thereof outside the dwelling, while said housing opening permits the animal to move between said housing and the dwelling; and means for ventilating to the outside for ventilating said housing and causing the odors therein to be released outside the dwelling.

* * * * *